(No Model.)

R. E. DUNHAM.
PEA PLANTER.

No. 572,876. Patented Dec. 8, 1896.

Witnesses
Macon Warthen
M. E. Warthen

Inventor
R. E. Dunham
By Glascock & Co.
Attorneys.

THE NORRIS PETERS CO., PHOTO-LITHO., WASHINGTON, D. C.

UNITED STATES PATENT OFFICE.

RALPH ELISHA DUNHAM, OF WARTHEN, GEORGIA.

PEA-PLANTER.

SPECIFICATION forming part of Letters Patent No. 572,876, dated December 8, 1896.

Application filed September 23, 1896. Serial No. 606,731. (No model.)

*To all whom it may concern:*

Be it known that I, RALPH ELISHA DUNHAM, a citizen of the United States, residing at Warthen, in the county of Washington and State of Georgia, have invented a certain new, useful, and valuable Improvement in Pea-Planters, of which the following is a full, clear, and exact description.

My invention has relation to attachments for pea or other planters; and it consists in the novel construction and arrangement of its parts, as hereinafter described.

Figure 1:
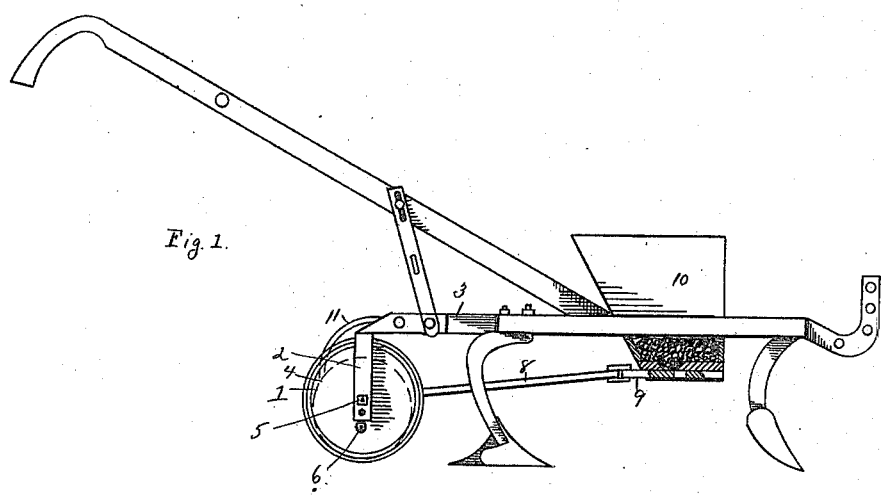
Figure 2:
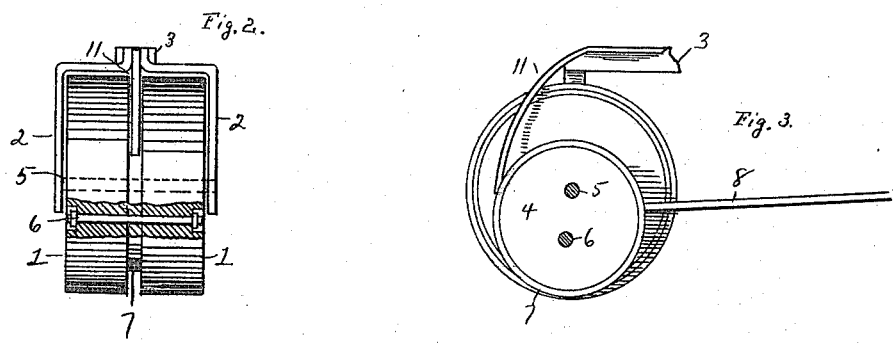
Figure 3:
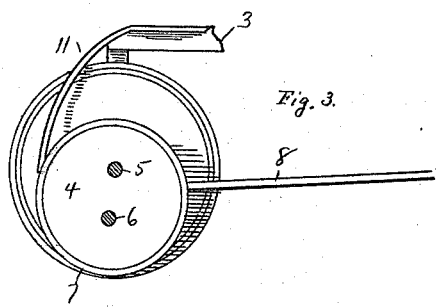

In the accompanying drawings, Figure 1 is a side view of a planter, partly in section, and having my invention attached thereto. Fig. 2 is a rear view of the rollers and attachments secured to the rear of the planter. Fig. 3 is a side view of one of the rollers, showing the eccentric in its proper place.

The invention consists of the two rollers 1 1, which are journaled in the arms 2 2. The upper ends of the arms 2 2 are bent at right angles and are secured to opposite sides of the beam 3. The eccentric 4 is interposed between the rollers 1 1 and is secured between the said rollers by the central shaft 5 of the rollers and the bolt 6, which passes through the two rollers and the said eccentric. The nuts on the ends of the bolt 6 are countersunk in the sides of the rollers, as shown in Fig. 2, to avoid striking the arms 2 2. The eccentric 4 holds the rollers 1 1 apart.

The eccentric is surrounded by the band 7, to which is attached the rod 8. Said rod is connected at its other end to the perforated slide 9, located in the bottom of the hopper 10. Therefore as the eccentric and rollers revolve the rod 8 passes back and forth and the slide 9 in the bottom of the hopper is operated, and thus the contents of the said hopper are dropped at uniform distances apart.

The shovels of the planter are so arranged as to open a trench to receive the seed, and other shovels are provided to cover the seed in the trenches. The rollers then pass over the earth and press it down about the seed, leaving a narrow strip of earth unpressed to correspond to the space between the rollers, and thus the sprouting plant can readily come to the surface. The beam 3 is also provided with the spring-rod 11. Said rod extends to the rear, and its end is bent down and passes between the rollers 1 1 and terminates in the vicinity of the band 7. The object of said spring-rod is to keep the space between the rollers 1 1 free from stones, dirt, &c., and thus facilitate the operation of the eccentric and its attachments.

Having described my invention, what I claim as new, and desire to secure by Letters Patent, is—

An attachment for planters consisting of two rollers suitably journaled, an eccentric interposed between said rollers and holding them apart, said eccentric adapted to operate the slide of the planter, a spring-rod secured to the planter and extending between the rollers and adapted to keep the space between the rollers free from stones, &c.

In testimony whereof I affix my signature in presence of two witnesses.

RALPH ELISHA DUNHAM.

Witnesses:
MACON WARTHEN, Sr.,
T. C. WARTHEN.